Oct. 9, 1951   H. W. CLIFFORD   2,570,919
NOTCHING AND EMBOSSING PUNCH AND DIE
Filed Nov. 28, 1947   2 Sheets-Sheet 2

INVENTORS
H. W. CLIFFORD
BY
ATTORNEY

Patented Oct. 9, 1951

2,570,919

UNITED STATES PATENT OFFICE 2,570,919

NOTCHING AND EMBOSSING PUNCH AND DIE

Harry W. Clifford, East Orange, N. J., assignor to Western Electric Company, Incorporated, New York, N. Y., a corporation of New York Application November 28, 1947, Serial No. 788,414

2 Claims. (Cl. 164—15)

This invention relates to article forming apparatus, and more particularly to apparatus for shearing and embossing metal containers.

In the manufacture of telephone equipment numerous electrical units are housed in metal containers which are initially blanked from sheet metal and formed into substantially the contours desired. These containers have open ends to receive the electrical units which frequently are surrounded within the containers by potting compounds. The open ends of the containers are then closed by covers which are usually apertured to receive the outwardly projecting terminals of the electrical units.

An object of the invention is to provide an apparatus which is simple in structure and automatically actuable to form an article such as the open end of a metal container.

With this and other objects in view, the invention comprises an article forming apparatus, including a mandrel to receive and support an article, forming elements cooperating with the mandrel to form the article, and an element to actuate the forming elements in a given sequence.

More specifically, the invention includes 2 pairs of forming elements, one pair of forming elements cooperating with the mandrel to emboss opposing sides of the article or container and to simultaneously shear material from the corners thereof and the other pair comprising tools for cutting material from the ends of the article between the cut corner portions. The two elements of the first pair are actuated by a single cam element and are so positioned that one of them is pushed and the other is pulled in the direction of the mandrel to perform their work simultaneously on the article. The cam element actuates the second pair of cutting elements after the forming elements have moved away from the mandrel.

Other objects and advantages will be apparent from the following detailed description when considered in conjunction with the accompanying drawings wherein Fig. 1 is a vertical sectional view of the apparatus;

Fig. 5 is an isometric view of the article at the completion of the forming operations.

Figure 1:
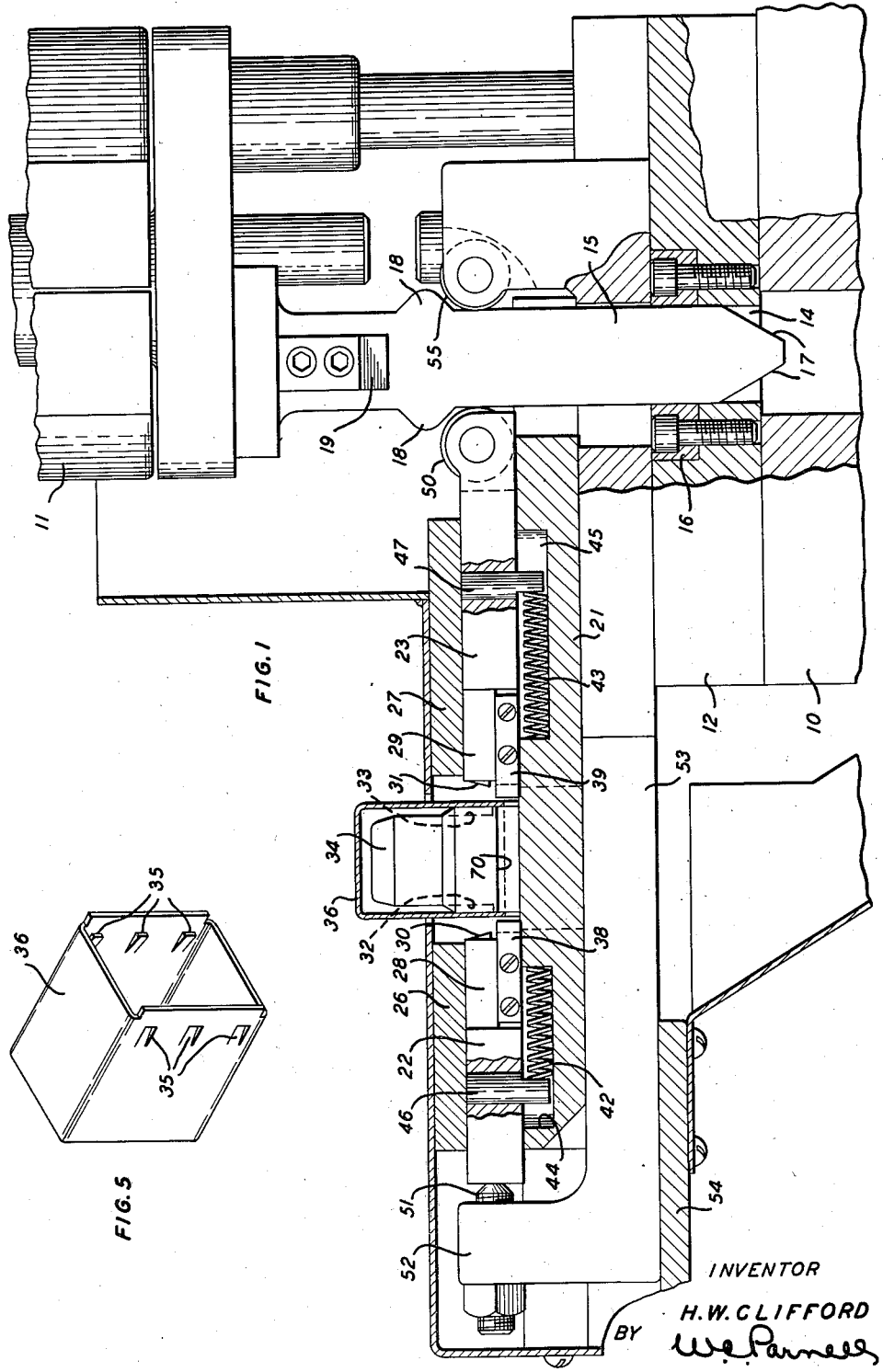

Referring now to the drawings, the apparatus is mounted on a bed 10 of a punch press having the conventional reciprocating ram 11. A mounting plate 12 is positioned upon the bed 10 of the press and is centrally apertured at 14 to receive an actuating element 15 and to support a bearing type of guide 16 for the element. The actuating element 15 is supported by the ram 11 and is reciprocated through operating cycles. The lower or leading end of the element 15 is tapered at 17 while cam members 18 are formed on opposite sides thereof at a given position. Other cam members 19, only one of which is shown in the drawing, are mounted on the intermediate sides of the element 15 and at like positions above the cam members 18.

A frame structure for the apparatus includes a horizontal member 21 to support forming units 22 and 23. These units are positioned in alignment with each other for sliding movement on the member 21 between guides 24 and 25 and beneath cover plates 26 and 27. The units 22 and 23 include embossing members 28 and 29, respectively, having projecting portions 30 and 31 which are to cooperate with grooves 32 and 33 in a mandrel 34 to form the embossed portions 35 in the sides of the article 36. The article 36 in the present embodiment is a metal container, the sides and open end of which is to be formed by this apparatus. A mandrel 34 is of a given size to readily receive the article and support it at a given position relative to the forming elements.

Figure 2:
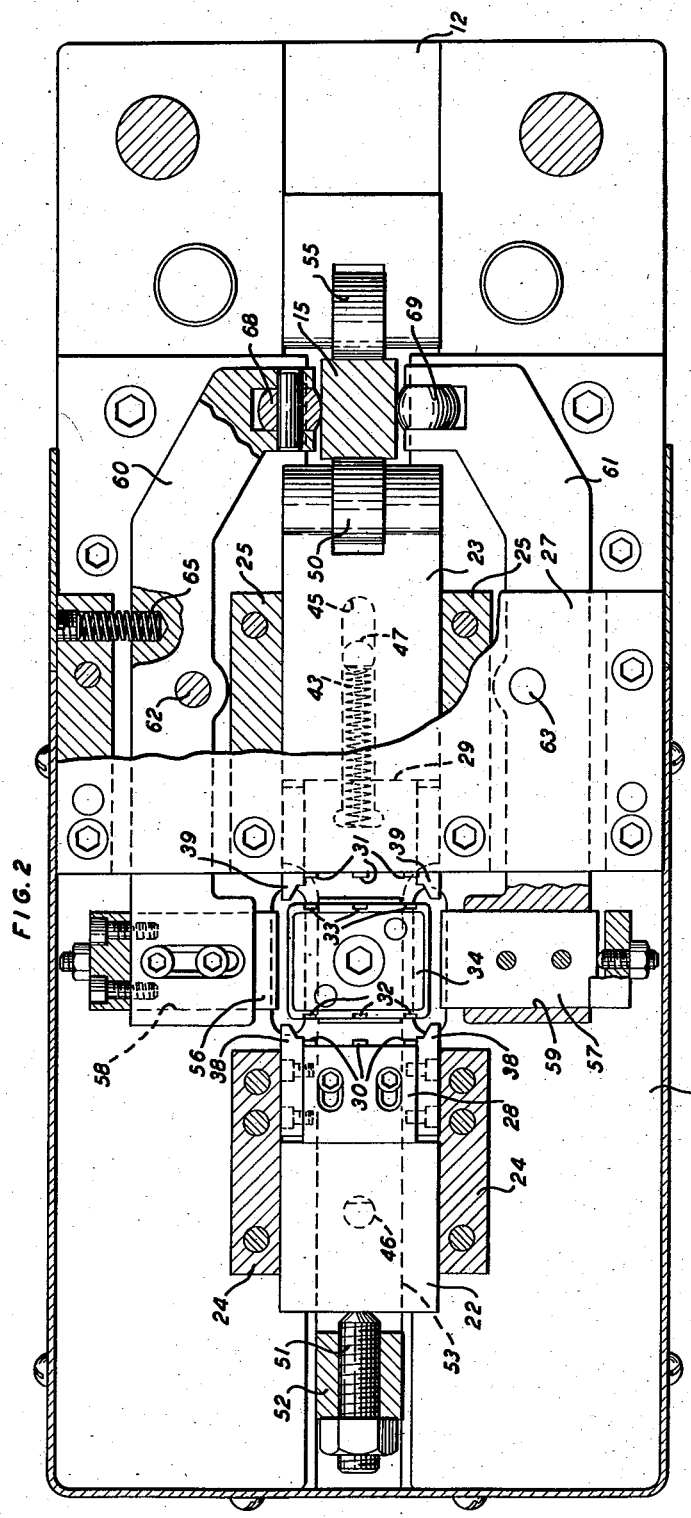
Fig. 2 is a horizontal sectional view of the apparatus.
Figure 4:
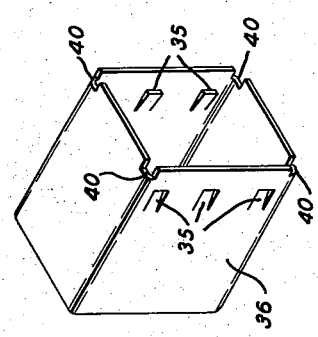
Fig. 4 is an isometric view of the article after the first forming operation.

Shearing members 38 and 39 are mounted on the units 22 and 23 and have their leading ends of the contours, shown in Fig. 2, to cooperate with companion shearing edges of the mandrel 34 to cut material from the corners of the article, as illustrated at 40, Fig. 4. This operation is performed during the embossing operation by the members 30 and 31 and their companion grooves 32 and 33 in the mandrel 34. The units 22 and 23 are normally urged outwardly away from the mandrel by springs 42 and 43 positioned in grooves 44 and 45 of the member 21, engaging pins 46 and 47 carried by the units 22 and 23. The unit 23 carries a cam roller 50 to be engaged by the adjacent cam member 18 on the actuating element 15. The unit 22 is engaged by an adjustable screw 51 carried by the vertical ram 52 of a pulling element 53, which rests upon the mounting plate 12 and a lateral member 54 of the main frame, to be reciprocated by the other cam member 18. This cam member 18 is positioned to engage a cam roller 55, supported by a vertical portion of the pulling element 53.

Forming or cutting members 56 and 57 are adjustably mounted in apertures 58 and 59 of cam levers 60 and 61, supported by the member 21 of the main frame and pivoted at 62 and 63 between the member 21 and the cover plate 27. Springs 65, only one of which is shown in the drawing, normally urge the cam levers 60 and 61 about their pivots to urge the cutting members 56 and 57 away from the mandrel 34 and cause cam rollers 68 and 69 to constantly engage the opposing surfaces of the actuating element 15.

The cam rollers 68 and 69 are rotatably supported by the adjacent ends of their respective cam levers 60 and 61, and are to be engaged by the cams 19 during downward movement of the actuating element 15.

The cutting elements 56 and 57 cooperate with cutting edges 70 at opposing sides of the mandrel 34 to cut the material between the sheared cores of the article, shown in Fig. 4, to complete the article as shown in Fig. 5. The ends of the cutting edges 70 provide the companion cutting edges cooperating with the shearing members 38 and 39 to produce the corner cuts 40 in the article.

Figure 3:
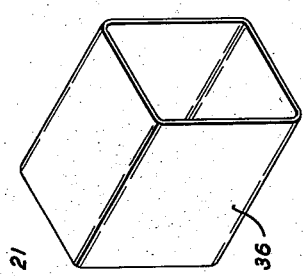
Fig. 3 is an isometric view of an article to be formed.

During operation of the apparatus, an article or container 36, as shown in Fig. 3, is placed over the mandrel 34 while the ram 11 is in its upper position, shown in Fig. 1, after which the conventional means is actuated to operate the press through a single cycle to reciprocate the actuating element 15. During the first portion of the downward movement of the actuating element 15, the cams 18 thereon engage their respective rollers 59 and 55 simultaneously, pushing the unit 23 toward the mandrel 34 until the members 31 cooperate with their grooves 33 to emboss the portions 35 in the adjacent side of the article and until the shearing members 39 cut away the material of the article at the adjacent corners 40. The unit 22 is actuated simultaneously with the unit 23, through the sliding movement of the member 53 caused by its cam 18, to pull the unit 22 toward the mandrel 34, causing the member 28 to emboss the adjacent side of the article and the shearing members 38 to shear the material from the adjacent corners of the article. The cams 18 are so formed that they will move the units 22 and 23 through an operating cycle and will allow the springs to move them away from the mandrel before the cams 19 engage their cam rollers 68 and 69 to pivot their levers 60 and 61 to move the cutting elements 56 and 57 inwardly to complete the forming operation on the article by cutting the material at the ends of the article between the sheared corners 40. This completes one-half of the operating cycle of the apparatus.

The ram 11 with the actuating element 15 is returned to its upper position, during which movement the cams 19 leave their cam rollers 68 and 69 to allow the spring 65 to return the cutting elements 56 and 57 to their outermost positions away from the mandrel after which the cams 18 will move the units 22 and 23 through a reverse operating cycle, leaving the units in their outermost positions where they are held by the springs 42 and 43. This operation may be carried out repeatedly upon successive articles placed on the mandrel 34, the forming operation being carried on in two steps, the first step including the pulling and pushing of the units 22 and 23 to complete the embossing operations and the removal of the material at the corners of the article after which the final cutting operations are carried out by actuation of the cutting elements 56 and 57.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming the open end of an article, such as a container, the apparatus comprising a support, a mandrel to support an article to be formed mounted on the support and having forming portions, units carrying forming tools on portions disposed on opposite sides of the mandrel and mounted on the support for movement relative to each other and the mandrel, a cam engaging member on one of the units spaced from the tool mounted thereon, a slide on the support having a projection to engage the other unit and a cam engaging member positioned adjacent the other cam engaging members, and a single cam reciprocable between the cam engaging members to push one of the forming units toward the mandrel to cause the forming tool thereof to cooperate with its respective forming portion of the mandrel to form a portion of the article and simultaneously move the slide to pull the other forming unit toward the mandrel to cause the forming tool thereof to cooperate with its forming portion of the mandrel to form another portion of the article.

2. An apparatus for forming the open end of an article, such as a container, the apparatus comprising a support, a mandrel to support an article to be formed mounted on the support and having forming portions, a pair of units, carrying forming tools on portions thereof disposed on opposite sides of the mandrel, mounted on the support for movement relative to each other and the mandrel and having cam engaging members spaced from the tools and from each other, a second pair of units carrying forming tools on portions disposed adjacent the remaining sides of the mandrel and mounted on the support for movement relative to each other and the mandrel, a cam engaging member on one of the second pair of units spaced from the tool mounted thereon and disposed a given distance with respect to the other cam engaging members, a slide on the support having a projection, to engage the other unit of the second pair, and a cam engaging member positioned a given distance from the other cam engaging members, and a single cam reciprocable between the cam engaging members of the pairs of units to move the pairs of units into operating position in a given sequence when their tools will cooperate with their respective forming portions of mandrel to form the open end of the article, the second pair of units being moved by the cam pushing one of the units and moving the slide to pull the other unit into operating position.

HARRY W. CLIFFORD.

REFERENCES CITED

The following references are of record in the file of this patent:

UNITED STATES PATENTS

| Number | Name | Date |
| --- | --- | --- |
| 925,070 | Adams | June 15, 1909 |
| 1,007,103 | Heine | Oct. 31, 1911 |
| 2,315,340 | Knudson | Mar. 30, 1943 |
| 2,340,162 | Whistler | Jan. 25, 1944 |

FOREIGN PATENTS

| Number | Country | Date |
| --- | --- | --- |
| 25,467 | Great Britain | Nov. 12, 1906 |
| 222,095 | Germany | May 20, 1910 |